(12) United States Patent
Seemann et al.

(10) Patent No.: US 7,954,889 B2
(45) Date of Patent: Jun. 7, 2011

(54) SUB-FRAME SYSTEM FOR INTEGRATING A GIVEN ROOF MODULE INTO A MOTOR VEHICLE BODY

(75) Inventors: Kim Boris Seemann, Nackenheim (DE); Claus Steller, Gross-Gerau (DE); Dirk Rainer Lungershausen, Wiesbaden (DE); Tony Hofmann, Tieringen (DE)

(73) Assignee: GM Global Technology Operations LLC, Detroit, MI (US)

( * ) Notice: Subject to any disclaimer, the term of this patent is extended or adjusted under 35 U.S.C. 154(b) by 34 days.

(21) Appl. No.: 12/175,344

(22) Filed: Jul. 17, 2008

(65) Prior Publication Data

US 2009/0026808 A1    Jan. 29, 2009

(30) Foreign Application Priority Data

Jul. 28, 2007   (DE) .......................... 10 2007 035 414

(51) Int. Cl.
   *B60J 7/00*     (2006.01)
(52) U.S. Cl. .............................. 296/216.01; 296/216.08
(58) Field of Classification Search ............ 296/216.01, 296/216.06–216.08, 210
   See application file for complete search history.

(56) References Cited

U.S. PATENT DOCUMENTS

| | | | | |
|---|---|---|---|---|
| 5,540,478 | A * | 7/1996 | Schuch | 296/210 |
| 6,073,995 | A * | 6/2000 | Klein | 296/216.02 |
| 6,129,413 | A * | 10/2000 | Klein | 296/220.01 |
| 6,786,538 | B1 * | 9/2004 | Turk et al. | 296/216.01 |
| 7,077,462 | B1 | 7/2006 | De Gaillard | |
| 7,367,615 | B1 | 5/2008 | Fallis, III et al. | |
| 7,441,833 | B1 * | 10/2008 | Pomeroy et al. | 296/216.06 |
| 2004/0212223 | A1 * | 10/2004 | Donovan et al. | 296/216.01 |
| 2008/0030051 | A1 * | 2/2008 | Tsukamoto et al. | 296/216.04 |
| 2008/0129087 | A1 | 6/2008 | Hallik | |
| 2008/0231086 | A1 | 9/2008 | Mathes et al. | |

FOREIGN PATENT DOCUMENTS

| | | |
|---|---|---|
| DE | 4313555 C1 | 5/1994 |
| DE | 10218601 A1 | 11/2003 |
| DE | 10228410 A1 | 1/2004 |
| DE | 10327194 A1 | 1/2005 |
| DE | 10333804 B3 | 2/2005 |
| DE | 10355656 | 12/2005 |
| DE | 102005016458 A1 | 10/2006 |
| DE | 102005044283 A1 | 4/2007 |
| WO | 0194141 A1 | 12/2001 |

OTHER PUBLICATIONS

German Search Report dated Oct. 1, 2008, issued in Application No. 10 2007 035 414.4.
European Search Report dated May 28, 2009, issued in Application No. 08009056.6.

* cited by examiner

*Primary Examiner* — Dennis H Pedder
(74) *Attorney, Agent, or Firm* — Ingrassia Fisher & Lorenz, P.C.

(57) ABSTRACT

A sub-frame system is provided for integrating at least two different roof modules in a motor vehicle body. The sub-frame system includes, but is not limited to a common sub-frame base sub-frame component for roof modules, preferably all the roof modules, mountable on the car body, as well as several different supplementary sub-frame components, each of which is suited for a different roof module, and detachably connected to the base sub-frame component, and appropriately replaced for the purpose of creating a sub-frame suitable for a specific roof module.

6 Claims, 3 Drawing Sheets

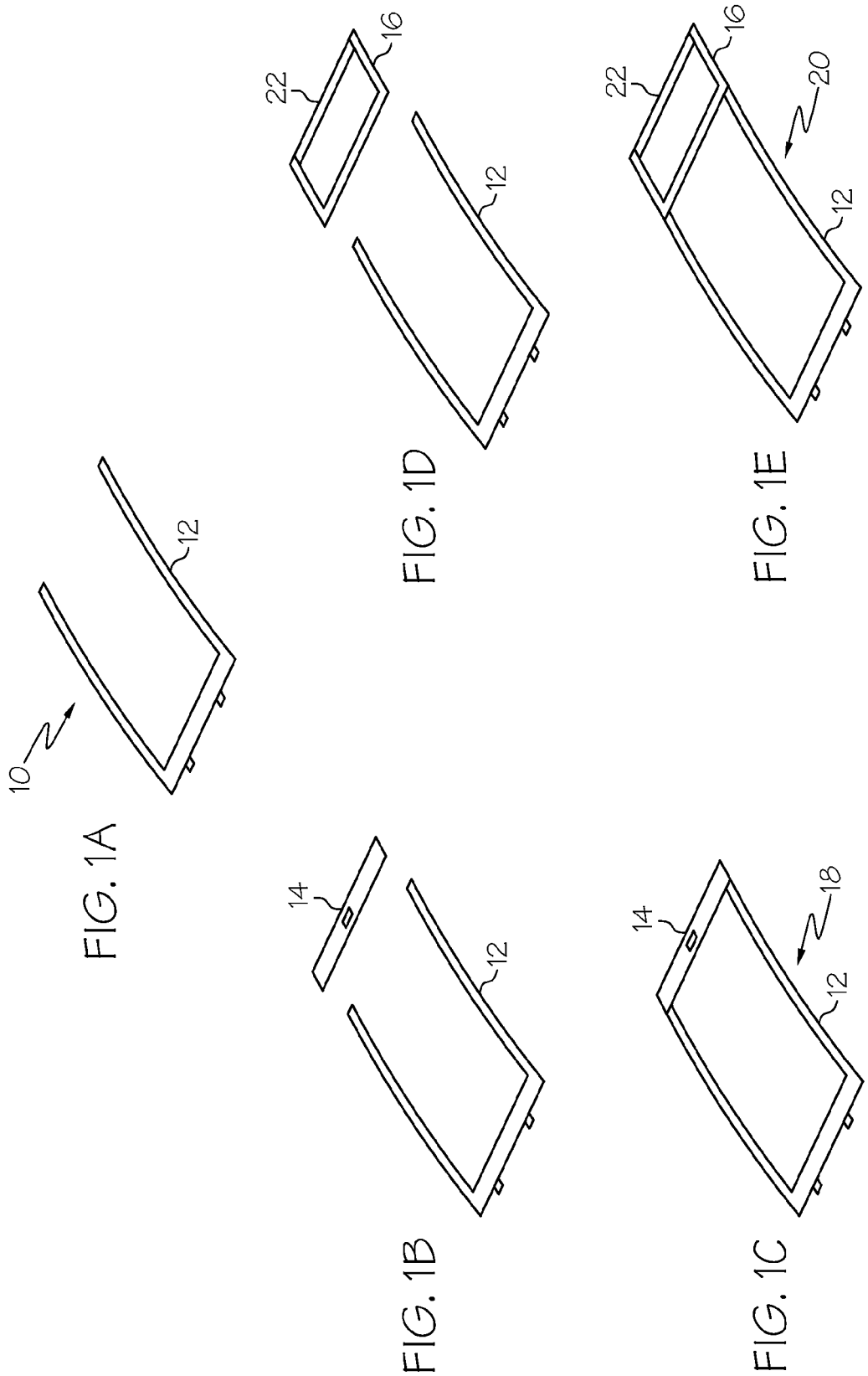

SUB-FRAME SYSTEM FOR INTEGRATING A GIVEN ROOF MODULE INTO A MOTOR VEHICLE BODY

CROSS-REFERENCE TO RELATED APPLICATION

This application claims priority to German Patent Application No. 102007035414.4, filed Jul. 28, 2007, which is incorporated herein by reference in its entirety.

TECHNICAL FIELD

The invention relates to a sub-frame system for integrating at least two different roof modules in a motor vehicle body as well as a motor vehicle body with a sub-frame for the integration of a roof module. Further, it relates to a method for integrating a roof module in the motor vehicle body.

BACKGROUND

Integration of a roof module in the motor vehicle body by means of sub-frame is already known. For example, DE 103 55 656 A1 describes such an integration.

Up to now, different roof modules have had to be mounted on different sub-frames in order for them to fulfill their respective functions. Consequently, different frames have to be used already at the construction stage. If, for instance, a certain motor vehicle type is provided with two roof types such as, in particular, a basic steel roof and a sunroof module, the sunroof has had to be integrated using a special sub-frame, welded on to the vehicle body at the construction stage and before the body goes through the cathodic dip painting and the painting line. Each roof variant therefore requires different steps in construction.

In view of the foregoing, at least one object is to create an improved sub-frame system, as well as an improved motor vehicle body of the kind mentioned in this background using different roof modules that can be simply and cost-effectively integrated in the car body, without the need to build in different sub-frames at the construction stage. In addition, at least one additional object is to provide a corresponding method for integrating a roof module into the car body. Furthermore, other objects, desirable features, and characteristics will become apparent from the subsequent summary and detailed description and the appended claims, taken in conjunction with the accompanying drawings and this background.

SUMMARY

Regarding the sub-frame system, the at least one object is solved through a sub-frame system for integrating at least two different roof modules in a motor vehicle body. The sub-frame includes, but is not limited to a common sub-frame base sub-frame component for roof modules, preferably all roof modules mountable on the car body, as well as several different supplementary sub-frame components, each of which is suited for a different roof module, and can be detachably connected to the base sub-frame component, and appropriately replaced, for creating a sub-frame suitable for a specific roof module. Thus, different roof modules can be integrated into the car body simply and cost-effectively, without the need to use different sub-frames at the construction stage.

According to an embodiment, only the part of the sub-frame which is specific to the different module variants is designed to be replaceable. Since the same base sub-frame component can be used for the different roof modules needing to be integrated into the vehicle body, thereby achieving a consistent bodywork manufacturing process.

Preferably, the supplementary sub-frame components are possible to attach to the base sub-frame component with screws. However, other non-permanent connection methods would be conceivable that allow for exchanging the appropriate supplementary sub-frame component.

The supplementary sub-frame components may, for example, constitute the rear part of the sub-frame built into the motor vehicle body. In this case it is preferably ensured that the points of contact between the base sub-frame component and the exchangeable supplementary sub-frame components are suitably protected from corrosion, since the exchange of the rear supplementary sub-frame component takes place, as a rule, after the cathodic dip-painting.

There is particular advantage in using the sub-frame system for integration of at least two of the following roof modules into the vehicle body: a basic roof module, in particular as a replacement for a common steel sheet roof, in particular, other roof modules with integrated functions, such as, preferably, at least one roof module with an integrated hatch roof, at least one panoramic roof module, at least one tilt-and-slide roof and/or the like.

The sub-frame system can comprise only two supplementary sub-frame components for two different roof modules, or also more than two supplementary sub-frame components for more than two different roof modules.

According to a preferred embodiment, the sub-frame system comprises at least one supplementary sub-frame component for, in particular, an integrated hatch, with an adjustable, particularly swivel mounted or hinged load beam. One such swivel hinged load beam is generally provided with motor vehicles with a hatch module.

It is advised that the load beam be adjustable between a closed position, in which it forms a closed, preferably rectangular, frame with the rest of the supplementary sub-frame component, and an open position, in which the supplementary sub-frame component are open at one side. Therefore, the load beam by the sub-frame built into the motor vehicle body can generally be pivoted or swiveled down into its open position. In practice, the load beam is arranged, with respect to the sub-frame built into the vehicle body, in the rear section of the appropriate supplementary sub-frame component. The load beam can lock on to the supplementary sub-frame component and/or the vehicle body.

For the basic roof module the rear roof frame section may be kept, while, for example, for the roof module with integrated hatch the rear supplementary sub-frame component is exchanged for a different supplementary sub-frame component. In this case, the rear supplementary sub-frame component can constitute, for example, a small frame, whose rear part is adjustable or swivel mounted, which is typically required, as a rule, in order to properly utilize the hatch module. This way, through the tilt function of the rear end of the supplementary sub-frame component, also longer items can be easily slid from below into the hatch opening. Finally, the swivel mounted cross beam or load beam can be locked from above again, so that the loaded item stays in its position.

The motor vehicle body according to an embodiment is characterized specifically in that the sub-frame comprises, a base sub-frame component as well as a detachably connectable supplementary sub-frame component.

The method according to an embodiment is characterized in that the integration of a roof module on the motor vehicle body takes place by means of the sub-frame system.

BRIEF DESCRIPTION OF THE DRAWINGS

The present invention will hereinafter be described in conjunction with the following drawing figures, wherein like numerals denote like elements, and FIG. 1 shows a schematic perspective view of an exemplary embodiment of the sub-frame system with the individual steps displayed for assembling the specific sub-frame for a basic roof module or for a roof module with an integrated hatch;

DETAILED DESCRIPTION

Figure 3:
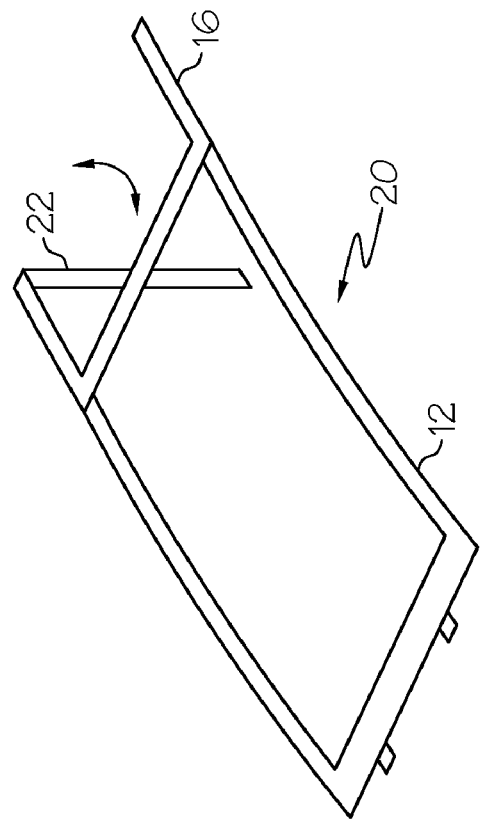
FIG. 3 shows a schematic perspective view of the completed sub-frame for the roof module with integrated hatch with the load beam in an opened position.

The following detailed description is merely exemplary in nature and is not intended to limit application and uses. Furthermore, there is no intention to be bound by any theory presented in the preceding background and summary or the following detailed description.

FIG. 1 displays a schematic perspective view of an embodiment, as an example, of the sub-frame system 10 for integration of at least two different roof modules in a motor vehicle body.

The sub-frame system includes, but is not limited to, for roof modules, preferably all roof modules, connectable to the vehicle body, a common base sub-frame component 12 as well as more, in the present example, two different supplementary sub-frame components 14, 16, which are suitable for different roof modules, in this case, a basic roof module as replacement for a standard steel sheet roof or another roof module with integrated hatch, and, for the purpose of creating a sub-frame suitable for a specific roof module, detachably connected to the common base sub-frame component 12 and can be appropriately replaced. Therefore, the two different supplementary sub-frame components 14, 16 can be screw-attached to the common base sub-frame component 12. In the present embodiment example, the two different supplementary sub-frame components 14, 16 constitute the rear part of the sub-frame built into the motor vehicle body.

As already mentioned, the sub-frame system 10 in the present example represents an embodiment for integration of two different roof modules, namely for integration of a basic roof module as replacement for a common steel sheet roof or integration of another roof module with an integrated hatch. In the present case it then comprises a supplementary sub-frame component 14 (see FIG. 1B, C) for the basic roof module and a supplementary sub-frame component 16 (see FIG. 1D, E) for the roof module with an integrated hatch. Basically, the sub-frame system can also comprise more than two supplementary sub-frame components for more than two different roof modules.

FIG. 1A shows a schematic perspective view of the common base sub-frame component 12 both roof modules integrated in the motor vehicle body. FIG. 1B and C show how the supplementary sub-frame component 14 for creating a sub-frame suitable for the basic roof module is detachably connected, particularly by means of screws, removably, with the base sub-frame component. By contrast, FIG. 1D and E show how the supplementary sub-frame component 16 for creating a sub-frame 20 suitable for a roof module with integrated hatch is connected, particularly by means of screws, removably, with the base sub-frame component.

Figure 2:
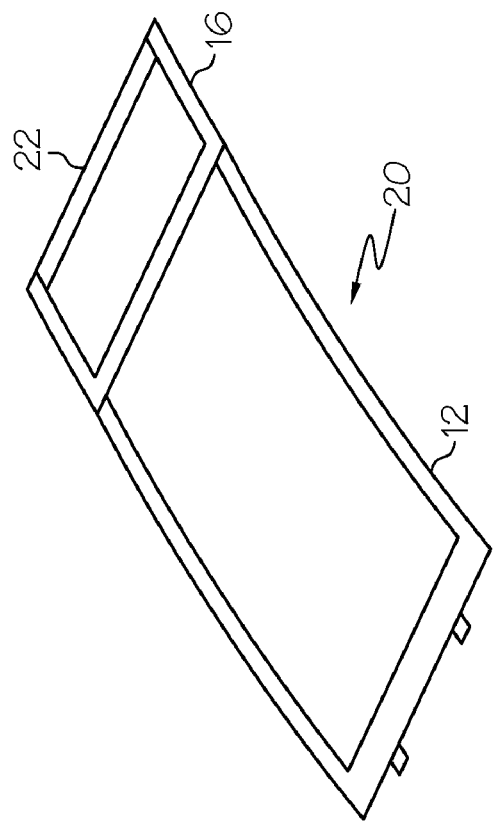
FIG. 2 shows a schematic perspective view of the completed sub-frame system for the roof module with integrated hatch with the load beam in a closed position.
Figure 4:
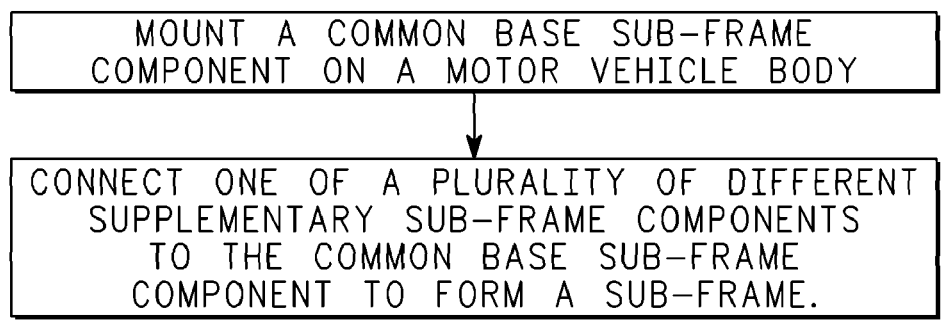
FIG. 4 is a block diagram illustrating a non-limiting embodiment of a method for integrating at least two different roof modules.

As particularly also shown by FIG. 2 and FIG. 3, the supplementary sub-frame component 16 suitable for a roof module with integrated head clap comprises an adjustable beam, particularly swivel mounted or hinged load beam 22.

For that reason, this load beam 22 is adjustable between a closed position (see FIG. 2), which forms a closed, preferably rectangular frame with the rest of the supplementary sub-frame component, and an open position, in which the supplementary sub-frame component is open at one side.

FIG. 2 shows a schematic perspective view of the sub-frame 20 for a roof module with integrated head clap, completed through the addition of the supplementary sub-frame component 16, with the load beam 22 in a closed position. Here the supplementary sub-frame component 16 for completing the sub-frame 20 is detachably connected, particularly by means of screws, to the common base sub-frame component 12.

FIG. 3 shows again a schematic perspective view of the sub-frame 20 for the roof module with integrated head clap, where, in this case, the rear load beam 22 in particular is in a open position. As already mentioned, the supplementary sub-frame component 16 for completing the sub-frame 20 is detachably connected, particularly by means of screws, to the common base sub-frame component 12. As FIG. 2 and FIG. 3 show the load beam 22 by the sub-frame built into the motor vehicle body that can generally be pivoted or swiveled down to its open position.

While at least one exemplary embodiment has been presented in the foregoing detailed description, it should be appreciated that a vast number of variations exist. It should also be appreciated that the exemplary embodiment or exemplary embodiments are only examples, and are not intended to limit scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A sub-frame system for integration of at least two different roof modules in a motor vehicle body, the sub-frame system comprising:

a common base sub-frame component mountable on the motor vehicle body, the common base sub-frame component including two longitudinally extending members, each having a front end and a rear end, the two longitudinally extending members being disconnected from one another at their respective rear ends; and a plurality of different supplementary sub-frame components, each of said plurality of different supplementary sub-frame components suited for one of the at least two different roof modules and each configured to be detachably connected to the common base sub-frame component such that each supplementary sub-frame component connects the two longitudinally extending members proximate their respective rear ends, and configured to create a sub-frame suitable for a specific roof module, wherein at least one of the supplementary sub-frame components includes an adjustable load beam, wherein the adjustable load beam is adjustable between a closed position and an open position, and wherein the adjustable load beam is arranged in a rear section of the at least one of the supplementary sub-frame components.

2. The sub-frame system according to claim 1, wherein the plurality of different supplementary sub-frame components extend beyond a rear portion of the common base sub-frame to form a rear part of the sub-frame when connected to the common base sub-frame component.

3. The sub-frame system according to claim 1, wherein at least one of the at least two different roof modules is a basic roof module replacement for a common steel sheet roof.

4. The sub-frame system according to claim 1, wherein the sub-frame system utilizes two different supplementary sub-frame components for two different roof modules.

5. The sub-frame system according to claim 1, wherein the adjustable load beam is configured to pivot into the open position.

6. A method for integrating at least two different roof modules and a motor vehicle body, comprising the steps of:

mounting a common base sub-frame component on the motor vehicle body, the common base sub-frame component having two longitudinally extending members each having a front end and a rear end and being disconnected from one another at their respective rear ends; and connecting one of a plurality of different supplementary sub-frame components to the common base sub-frame component to form a sub-frame wherein the one of the plurality of different supplementary sub-frame components connects the two longitudinally extending members proximate their respective rear ends, wherein at least one of the supplementary sub-frame components includes an adjustable load beam, wherein the adjustable load beam is adjustable between a closed position and an open position, and wherein the adjustable load beam is arranged in a rear section of the at least one of the supplementary sub-frame components.

\* \* \* \* \*